July 28, 1959 — A. E. STRAUSSER — 2,896,358
FISHING RIG
Filed May 24, 1956
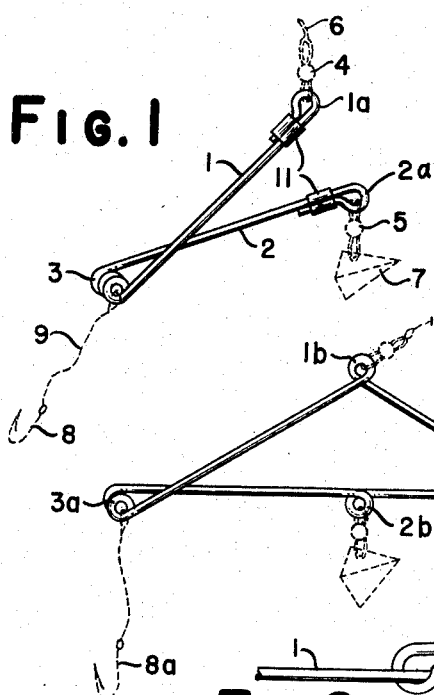
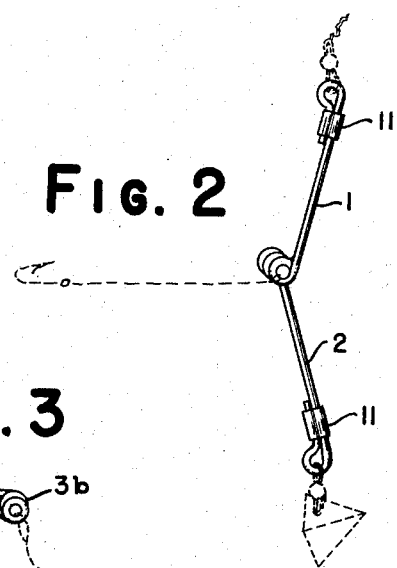
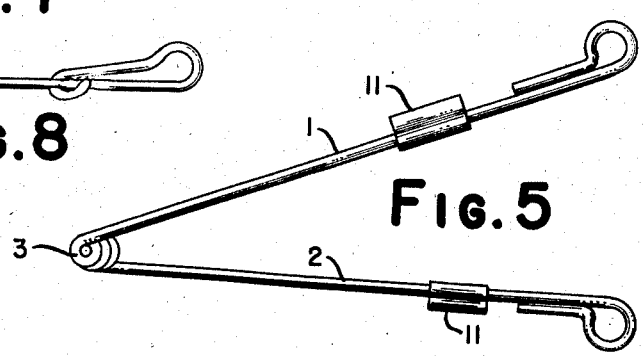
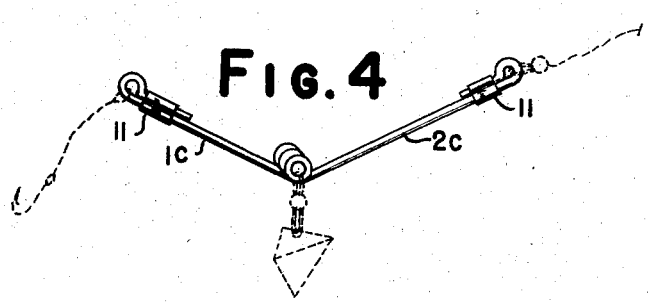
INVENTOR.
ARLAN E. STRAUSSER
BY William J. Ruano
his attorney

United States Patent Office 2,896,358
Patented July 28, 1959

2,896,358

FISHING RIG

Arlan E. Strausser, Reading, Pa.

Application May 24, 1956, Serial No. 586,987

5 Claims. (Cl. 43—42.72)

This invention relates to a fishing rig and more particularly to one which is adapted to provide immediate tension on the hook to secure the hold on a fish that is hooked without disturbing the sinker, and which may be in the form of a multi-unit. The present application is a continuation-in-part of my application Serial No. 386,911, filed October 19, 1953, entitled Fishing Rig.

An outstanding disadvantage of conventional fishing rigs is that they are generally of rigid construction and of such design that pulling on the line will effect pulling on both the hook and sinker simultaneously. Thus the sinker is unnecessarily disturbed and might frighten the fish—also will require repositioning after each tug on the line, all of which is unsatisfactory and mitigates against success in hooking the fish.

An object of the present invention is to provide a fishing rig which is devoid of the above named disadvantages of conventional rigs and which is essentially in the form of a pivotally moveable spring element so arranged as to enable activating the hook and bait by tugging on the line without disturbing the sinker.

A further object of the invention is to provide a resilient fishing rig which may be used either singly or in combination with similar rigs, depending upon whether one hook or a plurality of hooks are to be connected thereto.

Other objects and advantages of this invention will become apparent from the following description taken with the accompanying drawing wherein:

Figure 1 is a top perspective view of a fishing rig embodying the principles of the present invention;

Figure 2 is a similar view of the rig shown in Figure 1 in a different position resulting from reeling in of the line after snapping by the fisherman;

Figure 3 shows a modification of the fishing rig for accommodating a pair of hooks;

Figure 4 is a further modification similar to the form shown in Figure 1 but in which the angle of the arms is greater than 90° to make the rig useful in trolling;

Figure 5 is a fragmentary view showing the eyes 1a and 2a of Figure 1 with the thin brass tubing for closing the eyes shown in the retracted position;

Figure 6 is a top view of a modified form of eye made by bending the extremities of the fishing rig into the form of an open hook;

Figure 7 is a side view of the hook of Figure 6 shown in the open position; and

Figure 8 is a side view of the hook of Figure 6 shown in the closed position.

Referring more particularly to Figure 1 numerals 1 and 2 denote the arms of a fishing rig which are integrally joined together by a coiled spring portion 3. That is, portions 1, 2 and 3 may be made from a single piece of spring wire, preferably stainless steel which is lead coated to a dull finish. Arms 1 and 2 may be normally at an angle of about 30 or more degrees depending upon the type of fishing to be done. At the ends of arms 1 and 2 are eye portions 1a and 2a respectively onto which are connected swivels 4 and 5 which are connected to the line 6 and sinker 7, respectively. Eye portions 1a and 2a are each made by reversely bending the ends of wire portions 1 and 2 upon themselves after thin brass tubes 11 have been slipped onto the end portions of the wire. Swivels 4 and 5 are then inserted in place in the respective eyes 1a and 2a. Then the two pieces of tubing 11 are slipped over the extremities of the eyes and crimped fast thereon so as to form tight fastening elements for holding the eyes closed. After crimping, tubing 11 will assume a cross section similar to a figure 8. The hook 8 is connected by line 9 to the coil spring or apex of the angularly disposed arms 1 and 2. The spring wire used in forming the fishing rig may be made of different gauges of wire and coiled for different tensions, and the arms may be disposed at different angles, depending entirely upon the type of fishing. Moreover, different variations can be made by interchanging the hook, line and sinker to any of the three points 1a, 2a and 3 of the rig.

An outstanding feature of the construction shown is that arms 1 and 2 are pivotally connected by coil spring portion 3 so that upon lifting or tugging of line 6 the angle between arms 1 and 2 will be increased and portion 3 will be lifted so as to lift the hook without lifting the end or eye portion 2a of arm 2 onto which the sinker is attached. That is, sinker 7 may be kept stationary at or near the bottom of a stream and slight tugging on the wire will merely cause the hook to bob up and down without disturbing the position of the sinker. This is highly advantageous since it enables the fisherman to apply immediate tension on line 9 which carries the hook to securely hook and hold the fish. The first action when the bait is struck and seized by the fish is immediate tension at all three points of the rig. The resiliently connected arms also give an extra snap in casting which tends to catapult the rig end of the line, giving added distance to the cast.

While I have shown several coils forming portion 3 of the pivotal connection between arms 1 and 2 it will be apparent that a single coil may be used, or, in some instances, no coil at all if the arms are sufficiently resilient or are connected by a sufficiently resilient connection portion.

Figure 2 shows the position of the rig of Figure 1 when the line is snapped by the fisherman and reeled in. It will be noted that a direct pull with a slight twisting motion is exerted directly away from the striking fish.

Figure 3 shows a modification of the rig shown in Figure 1 wherein two different coil spring portions 3a and 3b are provided at the corners of a triangle formed by the spring wire. The eye portion 1b fastened to the line is located at the apex of the triangle. Thus, a pair of hooks 8a and 8b may be secured to the respective corners of the triangular rig. A construction similar to Figure 3 may also be assembled by joining two units of the construction shown in Figure 1, that is, by joining the respective eyes 1a and 2a. More than two units may also be joined together or with the unit shown in Figure 3 in case more than two hooks are to be fastened to the rig.

Figure 4 shows a further modification which is almost identical in construction with that shown in Figure 1 except that the arms 1c and 2c are disposed at an angle greater than 90° to make the rig useful in trolling. By using different weights of sinkers trolling may be done at different depths.

It will be seen that in the various modifications, the fundamental characteristic of the rig is to provide arms which are resiliently connected together so that the arms may be pivotally moveable resiliently about their joining portion or connection so that tension may be maintained during bobbing of the line.

Fundamentally to catch fish tension must be maintained at all times either by the spring of the fishing rod or by some other means. The present invention provides such other means which greatly aids in accomplishing this purpose, for it is known that after a fish is hooked so long as the line is maintained under tension, it is very difficult for the fish to become released, but if tension is not continually maintained it is rather easy for the fish to become unhooked.

Figures 6, 7 and 8 show a modified form of eye that can be used in the constructions shown in the various figures, and which eliminates the necessity of the thin brass tubing 11. The ends of the fishing rig-forming wire are bent into an open hook shape, as shown, wherein the hooked portion, by virtue of its springiness, will tend to stay in the open position as shown in Figure 7. However, after the swivels have been inserted into the eyes, the hooks may be closed by pushing the ends down from the position shown in Figure 7 to that shown in Figure 8.

Thus it will be seen that I have provided an efficient fishing rig of spring wire, angular construction which will enable constant bobbing or activating of the bait without disturbing the sinker, therefore requiring very light pulling or tugging by the fisherman and avoiding needless effort; also I have provided a fishing rig which is so constructed that a pull on the line will directly effect a pull on the hook long before influencing the position of the sinker; furthermore I have provided a fishing rig which is relatively simple and inexpensive in construction and which is readily adapted to be connected in multiple whenever two or more hooks are to be joined thereto.

While I have illustrated and described two embodiments of my invention, it will be understood that these are by way of illustration only, and that various changes and modifications may be made within the contemplation of my invention and within the scope of the following claims.

I claim:

1. A fishing rig in the form of an isosceles triangle comprising a pair of angularly disposed, spring wire portions, each having an intermediate, integral, helically coiled portion forming one of the pivotal corners of the triangle which is attachable to a hook, the base of said triangle having a central helically coiled portion which is attachable to a sinker, the apex also being helically coiled and which is attachable to a line, whereby a slight pull on the apex will raise said pivots without raising said central coiled portion.

2. A fishing rig comprising a single piece of spring wire bent into the form of an isosceles triangle and having integral, helically coiled portions at the three corners of the triangle and a helically coiled portion in the center of the base of the triangle, the apex forming sides of the triangle being disposed at an angle greater than 90°, the base corners of the triangle being attachable to hooks, said base central helically coiled portion being attachable to a sinker, and the apex, to the line, whereby a slight pull on the apex will yieldingly raise said corners without raising said central coiled portion.

3. A fishing rig in the form of an isosceles triangle comprising two spring wires, each having arms disposed at an acute angle and having an integral intermediate helically coiled portion forming a corner at the extremities of the base of the triangle, both of said wires having helically coiled end portions which are joined together to form said triangle, the apex forming ends being attachable to a line and the other joined ends being attachable to a sinker, whereby a slight pull on the apex will effect lifting of said corners without lifting said last mentioned coiled end portions.

4. A fishing rig as recited in claim 3 wherein each of said helically coiled end portions is in the form of a reversely bent portion of wire, forming an eye, together with a thin metal tube encircling a portion of the wire adjoining the eye so that it may be slipped over the end of the reversely bent portion and serve as a closure element for the eye.

5. A fishing rig as recited in claim 3 wherein at least one of said helically coiled end portions terminates in a reversely bent portion, having a hook at the end which is adapted to encircle an end portion of the wire to form a readily openable eye.

References Cited in the file of this patent

UNITED STATES PATENTS

| 1,251,810 | Oehler | Jan. 1, 1918 |
| 2,162,739 | Mindek | June 20, 1939 |
| 2,769,270 | Williams | Nov. 6, 1956 |

FOREIGN PATENTS

| 17,700 | Great Britain | Jan. 1, 1909 |
| 67,128 | Norway | Nov. 29, 1943 |